US011867376B1

(12) United States Patent
Chen

(10) Patent No.: US 11,867,376 B1
(45) Date of Patent: Jan. 9, 2024

(54) WARNING LAMP STRUCTURE

(71) Applicant: Po-Yen Chen, Tainan (TW)

(72) Inventor: Po-Yen Chen, Tainan (TW)

( * ) Notice: Subject to any disclaimer, the term of this patent is extended or adjusted under 35 U.S.C. 154(b) by 0 days.

(21) Appl. No.: 18/170,097

(22) Filed: Feb. 16, 2023

(51) Int. Cl.

| | |
|---|---|
| ***F21S 43/239*** | (2018.01) |
| ***F21S 43/19*** | (2018.01) |
| ***F21S 43/15*** | (2018.01) |
| ***F21V 31/00*** | (2006.01) |
| ***F21S 43/14*** | (2018.01) |
| ***F21V 17/12*** | (2006.01) |

(52) U.S. Cl.
CPC ............. *F21S 43/239* (2018.01); *F21S 43/14* (2018.01); *F21S 43/15* (2018.01); *F21S 43/195* (2018.01); *F21V 17/12* (2013.01); *F21V 31/005* (2013.01)

(58) Field of Classification Search
CPC ........ F21S 43/239; F21S 43/15; F21S 43/195; F21V 31/005
See application file for complete search history.

(56) References Cited

U.S. PATENT DOCUMENTS

| | | | | |
|---|---|---|---|---|
| 9,551,478 B2 * | 1/2017 | Ohno | F21V 17/16 | |
| 10,676,020 B1 * | 6/2020 | Stowell | F21S 45/50 | |
| 2011/0292658 A1 * | 12/2011 | Ho | F21V 5/048 | 362/307 |
| 2012/0287630 A1 * | 11/2012 | Ou | F21V 5/04 | 362/235 |
| 2019/0059168 A1 * | 2/2019 | Gerardo | H05K 7/20445 | |
| 2020/0200367 A1 * | 6/2020 | Chen | F21V 17/164 | |
| 2023/0036850 A1 * | 2/2023 | Olsen | F21S 43/26 | |

* cited by examiner

*Primary Examiner* — Christopher E Dunay
(74) *Attorney, Agent, or Firm* — Rosenberg, Klein & Lee

(57) ABSTRACT

The invention relates to a warning lamp structure, includes a lamp holder, having a receiving slot disposed therein, a circuit board accommodated in the receiving slot, and a lamp cover made of silicone material correspondingly covering an opening of the receiving slot of the lamp holder, wherein the circuit board has a plurality of light-emitting elements arranged thereon. Therefore, the use of silicone materials is to maintain the accuracy of the light projection of the light-emitting elements, and when the vehicle accidentally collides with other vehicles or a wall of a building while driving, and the lamp cover is impacted by the collision, since the lamp cover is made of silicone rubber and other elastomers, and has the characteristics of UV resistance and crack resistance, the lamp cover can therefore be prevented from being broken and damaged.

6 Claims, 4 Drawing Sheets

WARNING LAMP STRUCTURE

BACKGROUND OF THE PRESENT INVENTION

Field of Invention

The present invention relates to the technical field of lamp, and in particular, to a warning lamp.

DESCRIPTION OF RELATED ARTS

It is noted that the lamp cover of the warning light of conventional vehicle is mostly made of plastic materials such as polycarbonate (PC), which not only has poor light transmittance, but also likely affects the lighting warning effect. In addition, when the vehicle accidentally collides with other is vehicles or the wall of a building and is impacted by the collision, the plastic lamp cover is prone to rupture and damage, resulting in rain, dust and the like infiltrating into the warning lamp from the cracked part of the lamp cover, rendering quick damage to the warning lamp. In addition, the assembly of the lamp cover and the lamp holder of the conventional warning lamp is mainly locked by screws, which is a combination of one-by-one locking of the screws, which not only takes much time to assemble, but also relatively increases the manufacturing costs, which does not satisfy the needs of modern low-cost, high-production industries.

SUMMARY OF THE PRESENT INVENTION

The present invention relates to a warning lamp structure, wherein a main object is to provide a warning lamp structure that is easy to manufacture and capable of effectively avoiding impact damage.

In order to achieve the above-mentioned purposes of implementation, the inventor is to develop the following warning lamp structure, which includes a lamp holder, having a receiving slot disposed therein, a circuit board accommodated in the receiving slot, and a lamp cover made of silicone material correspondingly covering an opening of the receiving slot of the lamp holder, wherein the circuit board has a plurality of light-emitting is elements arranged thereon. Therefore, the use of silicone materials is to maintain the accuracy of the light projection of the light-emitting elements, and when the vehicle accidentally collides with other vehicles or the wall of a building while driving, and the lamp cover is impacted by the collision, since the lamp cover is made of silicone rubber and other elastomers, and has the characteristics of UV resistance and crack resistance, the lamp cover can therefore be prevented from being broken and damaged. In addition, the deformation of the lamp cover due to impact can be restored to its original state by its elasticity, so as to maintain its appearance integrity and aesthetics.

DETAILED DESCRIPTION OF THE PREFERRED EMBODIMENT

Figure 1:
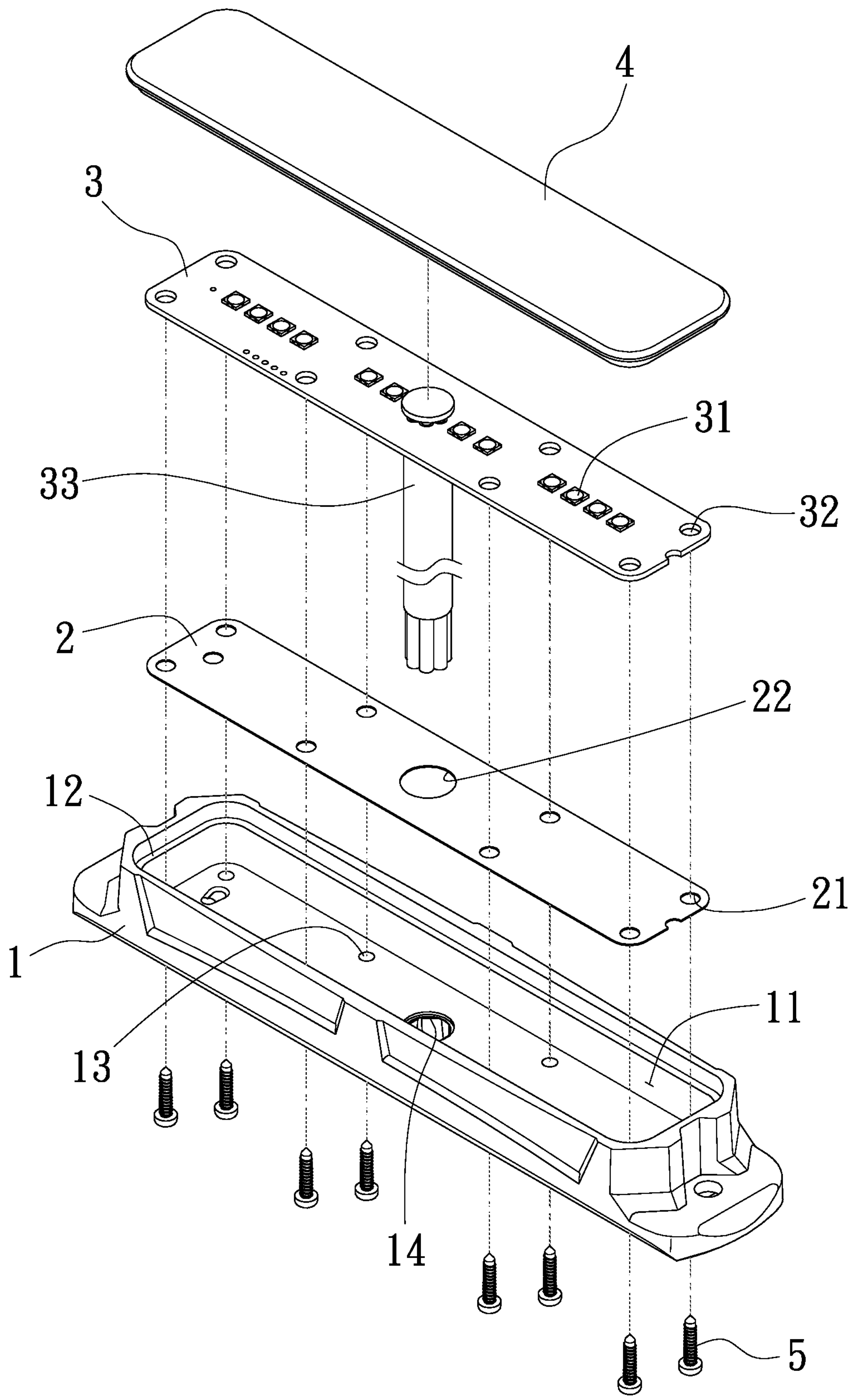
FIG. 1 is an exploded view of the present invention.
Figure 2:
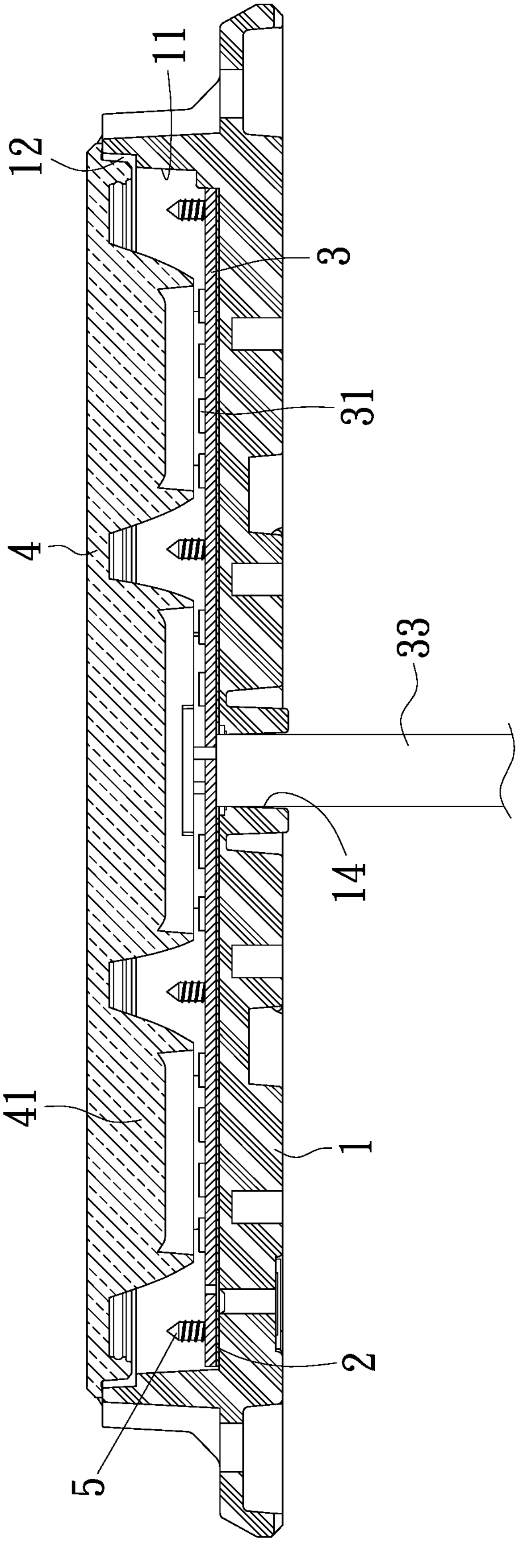
FIG. 2 is a sectional view of the present invention.

First, referring to FIGS. 1 and 2, a warning lamp structure of the present invention includes:

- a lamp holder (1), having a receiving slot (11) arranged therein, a first step edge (12) formed on a slot wall adjacent to an opening of the receiving slot (11) thereof, a plurality of first locking holes (13) arranged at a bottom of the receiving slot (11) thereof, and a first through hole (14) arranged in the middle of the bottom of the receiving slot (11) thereof;
- an insulating gasket (2), which is implemented as a silicon rubber elastomer, wherein the insulating gasket (2) is accommodated in the receiving slot (11) of the lamp holder (1), and laid on the bottom of the receiving slot, wherein the insulating gasket (2) has a plurality of second locking holes (21) arranged thereon to correspond to the position of the first locking holes (13) of the lamp holder (1), wherein the insulating gasket (2) has a second through hole (22) located in the middle position thereof to correspond to the position of the first through hole (14) of the lamp holder (1);
- a circuit board (3), which is accommodated in the receiving slot (11) of the lamp holder (1) and arranged on the insulating gasket (2), wherein the circuit board (3) includes a plurality of light-emitting elements (31) assembled thereon, wherein the light-emitting elements (31) are light-emitting diodes, wherein the circuit board (3) has a plurality of third locking is holes (32) arranged thereon to correspond to the positions of the first locking holes (13) of the lamp holder (1) and the second locking holes (21) of the insulating gasket (2), wherein the circuit board (3) has a power line (33) arranged at a middle position thereof so as to pass through the second through hole (22) of the insulating gasket (2) and pass through the first through hole (14) of the lamp holder (1) to the outside;
- a lamp cover (4), which is implemented as a silicon rubber elastomer, wherein the lamp cover (4) is correspondingly covered at the opening of the receiving slot (11) of the lamp holder (1), and a bottom peripheral edge of the lamp cover (4) is positioned against the first step edge (12) arranged on the slot wall of the receiving slot (11) of the lamp holder (1), wherein the lamp cover (4) has a plurality of optical light-guiding parts (41) formed on a bottom surface thereof to match the positions of the plurality of light-emitting elements (31) provided on the circuit board (3), wherein the opening of the receiving slot (11) of the lamp holder (1) and the peripheral edge of the lamp cover (4) are bonded and fixed through an adhesive; and
- a plurality of locking elements (5), which respectively pass through the first locking holes (13), the second locking holes (21) and the third locking holes (32) corresponding to the lamp holder (1), the insulating gasket (2) and the circuit board (3), so that the lamp holder (1), the insulating gasket (2) and is the circuit board (3) are locked and affixed, wherein the locking elements (5) are implemented as screws.

Accordingly, when used and implemented, the warning lamp of the invention can be installed on the left and right sides of the vehicle. When the vehicle is driving at night or in an environment with low light, the light-emitting elements (31) can be activated. The light emitted by the light-emitting elements (31) will be projected onto the bottom surface of the lamp cover (4) and the optical light-guiding parts (41) matched therewith, so as to be refracted and reflected by the optical light-guiding parts (41), and then be projected from the lamp cover (4), wherein the lamp cover (4) made of silicone material meets the design requirements of transparency and astigmatism, so as for obtaining the required lighting brightness and light shape, and achieving a good warning lighting effect.

Furthermore, when the vehicle accidentally collides with other vehicles or building walls, and the lamp cover (4) is impacted by the collision, because the lamp cover (4) is made of silicone rubber and other elastomers, which has very good UV resistance and crack resistance ability to prevent the lamp cover (4) from cracking and damaging, it thus prevents rain, dust, etc. from seeping into the warning light, causing damage to the warning lamp. In addition, the deformation of the lamp cover (4) due to impact can also be restored to its original shape by virtue of its elasticity, so as to maintain the is integrity and aesthetics of the appearance of the warning lamp.

In addition, the invention is provided with the elastic insulating gasket (2) between the lamp holder (1) and the circuit board (3). The elastic insulating gasket (2) can provide a shockproof effect of disturbing and damaging the transmission of shock waves, and prevent the light-emitting elements (31) on the circuit board (3) from being damaged by the vibration of the vehicle when driving, so as to extend the service life of the warning lamp. In the present invention, the first step edge (12) arranged on the slot wall of the receiving slot (11) of the lamp holder (1) is positioned against the bottom peripheral edge of the lamp cover (4), and then the lamp cover (4) and the lamp holder (1) are coupled and fixed through adhesive, so that the assembly time and cost of the lamp cover (4) and the lamp holder (1) of the warning lamp can be greatly saved, so as to meet the modern industrial demand of low cost and high productivity.

Figure 3:
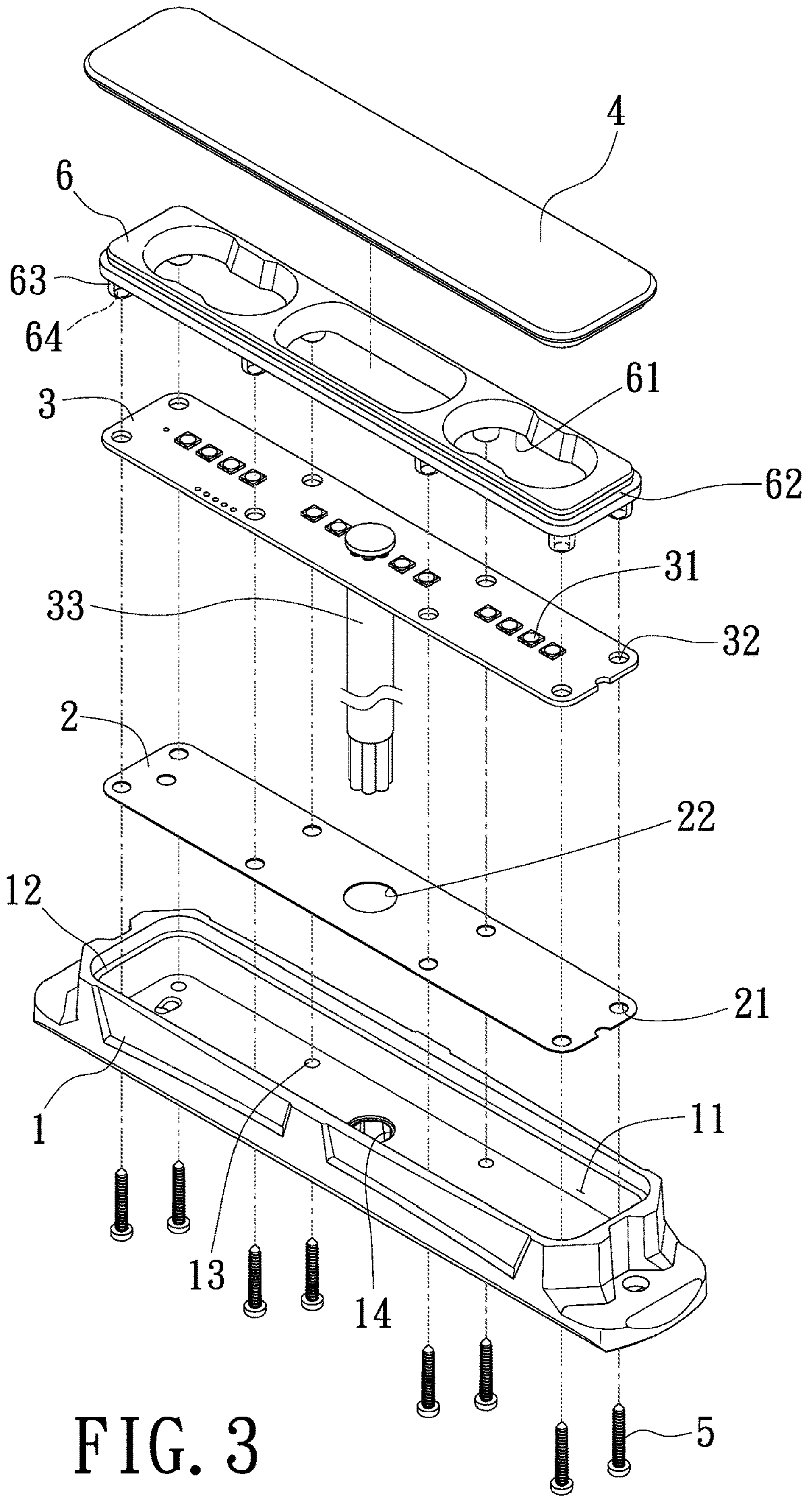
FIG. 3 is an exploded view of another embodiment of the present invention.
Figure 4:
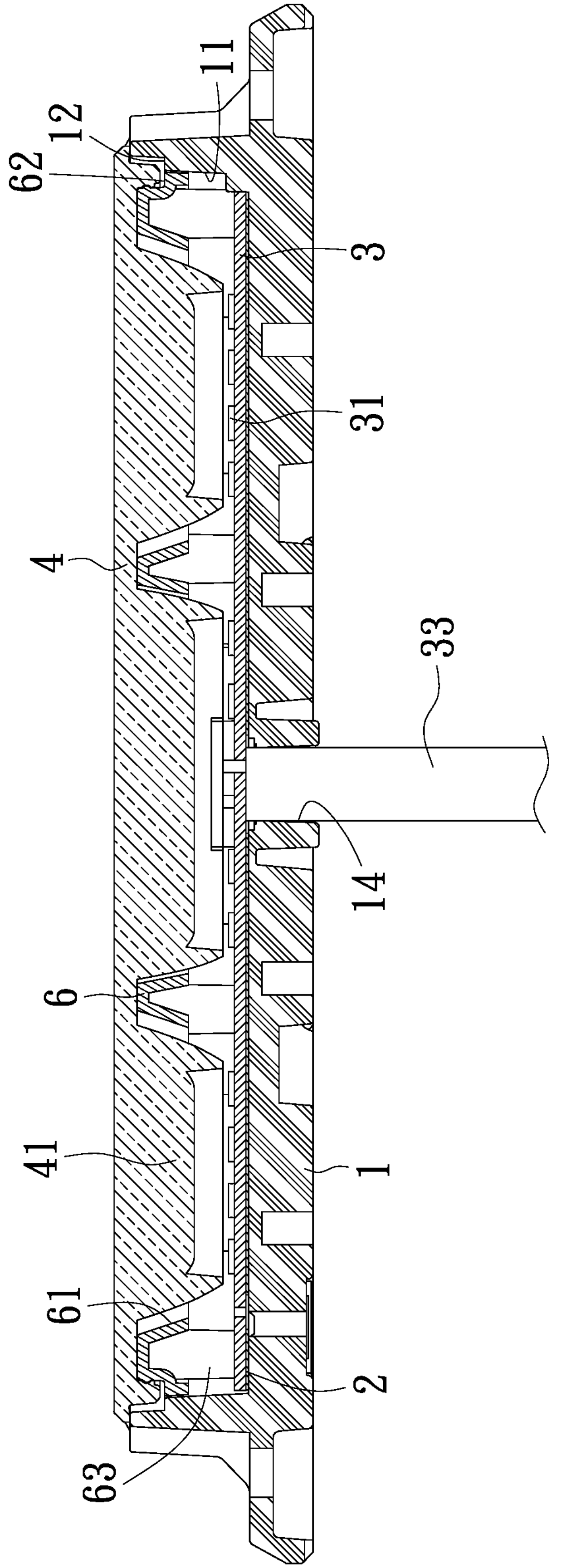
FIG. 4 is a sectional view of another embodiment of the present invention.

The aforementioned embodiments or drawings do not limit the implementation of the warning lamp structure of the present invention. Referring to FIGS. 3 and 4, another embodiment of the warning lamp of the present invention further includes a support frame (6) arranged between the circuit board (3) and the lamp cover (4), and accommodated in the receiving slot (11) of the lamp holder (1). In addition, the support frame (6) has a plurality of penetration holes (61) arranged thereon, wherein the positions is and shapes of the penetration holes (61) match the positions and shapes of the optical light-guiding parts (41) provided on the bottom surface of the lamp cover (4), so as for the optical light-guiding parts (41) of the lamp cover (4) to be respectively arranged in the penetration holes (61) corresponding to the positions and shapes of the support frame (6). The support frame (6) has a second step edge (62) formed along a peripheral side of a first end surface thereof adjacent to the lamp cover (4) to correspond to the position of the first step edge (12) arranged on the slot wall of the receiving slot (11) of the lamp holder (1), so that the bottom peripheral edge of the lamp cover (4) is positioned against the first step edge (12) of the lamp holder (1) and the second step edge (62) of the support frame (6). In addition, the support frame (6) has a plurality of assembly columns (63) formed on a second end surface thereof adjacent to the circuit board (3), wherein each of the assembly columns (63) has a fourth locking hole (64), corresponding to the positions of the third locking holes (32) of the circuit board (3), the second locking holes (21) of the insulating gasket (2), and the first locking holes (13) of the lamp holder (1). The locking elements (5) respectively pass through the first locking holes (13), the second locking holes (21), the third locking holes (32) and the fourth lock hole (64) corresponding to the lamp holder (1), the insulating gasket (2), the circuit board (3) and the assembly columns (63) of the support frame (6), so as to lock and fix the support frame (6) and the lamp is holder (1). In addition, the present invention can also omit the installation of the insulating gasket (2), and any appropriate changes or modifications made by those with ordinary knowledge in the technical field should be considered as not departing from the patent scope of the present invention.

The present invention has the following advantages:

1. The lamp cover of the warning lamp structure of the present invention is made of silicon rubber and other elastomers, which can meet the design requirements of transparency and light distribution, and can maintain the accuracy of light projection for the light-emitting elements in hot and humid environments.
2. The lamp cover of the warning lamp structure of the present invention is made of silicon rubber and other elastomers. Therefore, when the lamp cover is accidentally impacted by a collision, the lamp cover can be prevented from being broken and damaged, and at the same time, the elasticity of the lamp cover can be used to restore the deformation caused by the impact to the original shape, so as to maintain the integrity and aesthetic appearance of the warning lamp.
3. An elastic insulating gasket is arranged between the lamp holder and the circuit board of the warning lamp structure of the present invention. Therefore, when the vehicle vibrates while driving, the elastic insulating gasket can provide an anti-vibration effect of interfering with the vibration is and destroying the transmission of shock waves, and avoid damage to the light-emitting elements on the circuit board due to vibration.
4. The slot wall of the receiving slot of the lamp holder of the warning lamp structure of the present invention is formed with a step edge to be positioned against the bottom peripheral edge of the lamp cover, and then coated with an adhesive for the coupling. Based on this simple design, the assembly time and cost of the warning lamp can be greatly saved.

What is claimed is:

1. A warning lamp structure, comprising:

a lamp holder having a receiving slot disposed therein, the lamp holder having a first step edge formed on a slot wall adjacent to an opening of the receiving slot;

a circuit board accommodated in the receiving slot, the circuit board having a plurality of light-emitting elements arranged thereon;

a lamp cover formed of a silicon rubber elastomer and correspondingly covering an opening of the receiving slot of the lamp holder, the lamp cover having a plurality of optical light-guiding parts formed at positions on a bottom surface thereof in correspondence with positions of the plurality of light-emitting elements provided on the circuit board; and a support frame accommodated in the receiving slot of the lamp holder and arranged between the circuit board and the lamp cover, the support frame having a plurality of penetration holes arranged at positions thereon, the positions and shapes of the penetration holes correspond with the positions and shapes of the optical light-guiding parts of the lamp cover, whereby the optical light-guiding parts of the lamp cover are respectively arranged in the penetration holes of the support frame, wherein the support frame has a second step edge formed along a peripheral side of an end surface thereof adjacent to the lamp cover to correspond to a position of the first step edge, whereby a bottom peripheral edge of the lamp cover is positioned against the first step edge of the lamp holder and the second step edge of the support frame, wherein the opening of the receiving slot of the lamp holder and the peripheral edge of the lamp cover are bonded and fixed with an adhesive.

2. The warning lamp structure as claimed in claim 1, wherein the lamp holder has a plurality of first locking holes arranged at a bottom of the receiving slot thereof, wherein the circuit board has a plurality of third locking holes arranged thereon to correspond to the positions of the first locking holes of the lamp holder, wherein the warning lamp structure comprises a plurality of locking elements, which respectively pass through the first locking holes and the third locking holes corresponding to the lamp holder and the circuit board, so that the lamp holder and the circuit board are locked and fixed.

3. The warning lamp structure as claimed in claim 2, further comprising an insulating gasket, accommodated in the receiving slot of the lamp holder, wherein the insulating gasket is a silicon rubber elastomer, wherein the insulating gasket is arranged on the bottom of the receiving slot, and the circuit board is arranged on the insulating gasket.

4. The warning lamp structure as claimed in claim 3, wherein the lamp holder has a plurality of first locking holes arranged at the bottom of the receiving slot thereof, wherein the insulating gasket has a plurality of second locking holes arranged thereon to correspond to the position of the first locking holes of the lamp holder, wherein the circuit board has a plurality of third locking holes arranged thereon to correspond to the positions of the first locking holes of the lamp holder and the second locking holes of the insulating gasket, wherein the warning lamp structure comprises a plurality of locking elements, which respectively pass through the first locking holes, the second locking holes and the third locking holes corresponding to the lamp holder, the insulating gasket and the circuit board, so that the lamp holder, the insulating gasket and the circuit board are locked and fixed.

5. The warning lamp structure as claimed in claim 1, wherein the lamp holder has a plurality of first locking holes arranged at a bottom of the receiving slot thereof, wherein the circuit board has a plurality of circuit board locking holes arranged thereon to correspond to the positions of the first locking holes of the lamp holder, wherein the support frame has a plurality of assembly columns formed on an end surface thereof adjacent to the circuit board, wherein each of the assembly columns has an assembly column locking hole, corresponding to the positions of the circuit board locking holes and the locking holes of the lamp holder respectively, wherein the warning lamp structure comprises a plurality of locking elements, which respectively pass through the locking holes of the lamp holder, the circuit board locking holes and the assembly column locking holes, so that the lamp holder, the circuit board and the support frame are locked and fixed.

6. The warning lamp structure as claimed in claim 1, further comprising an insulating gasket, accommodated in the receiving slot of the lamp holder, wherein the insulating gasket is a silicon rubber elastomer, wherein the insulating gasket is arranged on the bottom of the receiving slot, and the circuit board is arranged on the insulating gasket.

* * * * *